United States Patent [19]

Koike

[11] Patent Number: 4,524,437
[45] Date of Patent: Jun. 18, 1985

[54] SIMPLIFIED SOUND-REPRODUCING DEVICE HAVING AN EXTERNAL OUTPUT SHAFT

[75] Inventor: Eishi Koike, Sagamihara, Japan

[73] Assignee: Ozen Corporation, Tokyo, Japan

[21] Appl. No.: 536,867

[22] Filed: Sep. 29, 1983

[30] Foreign Application Priority Data

Jun. 24, 1983 [JP] Japan .................. 58-113912

[51] Int. Cl.³ .............. A63H 5/00; A63H 29/00; G11B 25/04
[52] U.S. Cl. ........................... 369/67; 369/63; 369/266; 446/302
[58] Field of Search .......... 369/63, 65, 67, 258, 369/264, 265, 266, 292; 46/175 AR, 232; 446/397, 408, 141, 142

[56] References Cited

U.S. PATENT DOCUMENTS

| | | | |
|---|---|---|---|
| 1,185,559 | 5/1930 | Vaughan | 369/63 |
| 1,341,102 | 5/1920 | Belknap | 46/175 AR |
| 3,590,525 | 7/1971 | Tomaro | 46/232 |
| 3,600,848 | 8/1971 | Marshall et al. | 46/175 AR |
| 3,747,266 | 7/1973 | Ono | 46/232 |
| 3,870,318 | 3/1975 | Poynter | 369/67 |
| 4,104,821 | 8/1978 | Nakajima | 46/175 AR |

*Primary Examiner*—Steven L. Stephan
*Attorney, Agent, or Firm*—Basile, Weintraub & Hanlon

[57] ABSTRACT

In a simplified sound-reproducing device, a motor is coupled by a transmission to a record disc for driving the record disc and an external output shaft extending outside from the casing of the device.

Transmission consists of a driving wheel fixed to an extension of a center shaft and a follower wheel fixed to the output shaft which is disposed parallel to the center shaft. The driving wheel and the follower wheel are arranged to either mesh or not mesh with each other depending on their relative relationship in the axial direction by caused axial shifting of the center shaft.

Virtue of the construction as mentioned above, the device can drive, by relying on the driving motor alone, another device or attachment subsequent to or concurrent with sound reproduction.

6 Claims, 6 Drawing Figures

(A)

(A)

(A)

SIMPLIFIED SOUND-REPRODUCING DEVICE HAVING AN EXTERNAL OUTPUT SHAFT

BACKGROUND OF THE INVENTION

I. Field of the Invention

The present invention relates to a simplified sound-reproducing device and, more particularly, the present invention relates to a sound-reproducing device which has an external output shaft to drive an external means and a clutch means.

II. Prior Art

The inventor of the present invention has invented a prior invention (pending Japanese Patent Application No. 192393/1981) which uses a constant torque spring motor as a power source and is conneccted an external output shaft that plays a role as a starting bar. The external output shaft becomes operative concurrently with the rotation of the record disc, but is not intended to perform another operation subsequent to a sound-reproduction, namely, to related successive motions.

Recently, in the field of railway toys, there has been an increasing demand for toy vehicles or trains which start subsequent to the announcement of departure and destination of the train. Similar demands have been increasing in many other fields, and yet such devices are required to be simple and stout in construction for satisfying high durability.

OBJECTS OF THE INVENTION

The present invention aims to satisfy such demands as mentioned above. Accordingly, an object of the present invention is to provide a device which can be used as a motor for driving a sound-reproducing device and yet capable of automatically perfoming another motion successive to its proper function of sound reproduction.

Another object of the present invention is to provide a simplified sound-reproducing device having a construction capable of starting or finishing another action concurrent with either the starting or completion of sound reproduction.

A further object of the present invention is to simplify the transmission means to the output shaft for external means provided in a simplified sound-reproducing device.

SUMMARY OF THE INVENTION

The present invention, which will be described subsequently in greater detail, comprises a means for transmitting a driving force from a motor to an output shaft for other external means consisting of a driving wheel fixed to the extension of the center shaft supporting a record disc and a follower wheel fixed to an output shaft for the external means, which is disposed parallel to the center shaft and is connected to the driving wheel. In this construction, the center shaft is reciprocally movable along its axis, together with the record disc, and is normally urged by a stylus pressure spring toward a speaker cone and a necessary stylus pressure is imparted when a pickup which is swingably movable between the starting point and the end point of sound reproduction is held between the record disc and the vibration transmitting member attached to the head of the speaker cone.

The aforesaid driving wheel and the follower wheel constitute a transmission means which constitute or interrupt their mutual coupling due to their relative axial movement caused by the axial movement of the center shaft.

In addition, a portion is provided at the end point of sound reproduction wherein the pickup drops thereinto and no longer sustains the record disc; that is, an annular recess is formed for letting the sound-reproducing stylus fall, where the end point of sound reproduction is located near the center shaft, while an outer periphery of the record disc itself can be used as a vacant spot for dropping or lowering the stylus.

In these cases, if the pickup goes beyond the end point of sound reproduction, the record disc is no longer sustained by the record disc and moves axially by being urged by the stylus force spring, thereby the relative position between the driving wheel and the follower wheel can vary in an axial direction.

This means that the operation of the output shaft can be started or finished concurrent with the completion of sound reproduction, by virtue of the meshing of the driving wheel with the follower wheel or by out of meshing between them.

By embodying the present invention, a simply constructed device can have another operation automatically performed successive to the reproduction of the recorded sounds by using the motor of the simplified sound-reproducing device itself. In addition, the device of this invention enables starting and finishing of another operation to be done concurrent with the starting and finishing of the sound reproduction.

BRIEF DESCRIPTION OF THE DRAWINGS

The description herein makes reference to the accompanying drawings wherein like reference numerals refer to like components throughout the several views, and wherein.

DETAILED DESCRIPTION OF THE PREFERRED EMBODIMENTS

Figure 1:
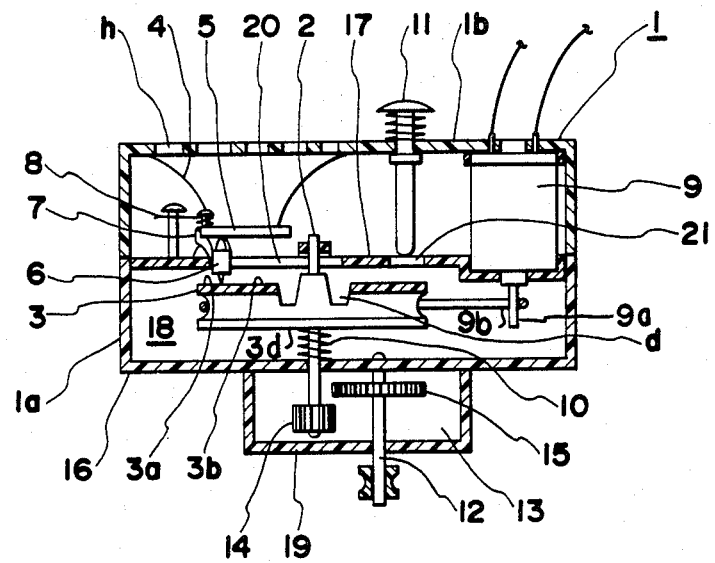
FIG. 1(A) is a sectional, elevational view of a first embodiment of the present invention.
FIG. 1(B) is a sectional, elevational view similar to FIG. 1(A) showing a position of the related parts.

Referring now to the drawings, and in particular to FIG. 1(A), wherein there is illustrated one example of the present invention in the form of a casing 1 which consists of a chassis 1a and a housing 1b coupled thereon.

In the chassis 1a of the casing 1, a space 18 is defined by a bottom plate 16 and a middle plate 17.

Underneath the bottom plate 16, a transmission case 19 is formed by being attached to the adjacent face of the bottom plate 16.

Within the space 18, a record disc 3 formed integral with a center shaft 2 is mounted in the space 18. The center shaft 2 is journally received by the bottom plate 16 and the middle plate 17.

This record disc 3 can be made either integral with a turntable 3D or separate therefrom as an exchangeable type.

In the example as shown, the turntable 3D is provided with a pulley groove for power transmission around its outer periphery and is made integral with the record disc 3, which is normally supported by a coil spring 10 compressed between the bottom plate 16 and the turntable 3D.

The record disc 3 has a starting point of sound reproduction 3a and an end point of sound reproduction 3b, on the region of its outer periphery and on the portion near and around the center shaft, respectively.

The record disc 3 is also formed, at its central portion around the center shaft 2 constituting the end point of sound reproduction, to have an annular recessed portion for allowing a reproducing stylus to fall down.

The middle plate 17 has a through aperture 20 and a through hole 21, for passing a pickup and a starting bar, respectively.

On the middle plate 17, a tone arm 7 having the pickup 6 at its foremost end is pivotally attached to be swung both along and away from the recorded face of the record disc 3.

Only a very slight extent of swing motion is required for the pickup 6 in moving away from the recorded face. The tone arm 7 is normally urged by a return spring 8 to move toward the starting point of sound reproduction and away from the recorded face.

Further on the middle plate 17 of the chassis 1a, a motor 9 for driving the record disc 3 is fixedly attached, the output shaft 9a of which extends parallel to the axis of the record disc 3 with the outer periphery being confronted with the side face of the output shaft 9a. A belt 9b is extended between the output shaft 9a and the record disc turntable 3d for transmitting power.

The housing 1b of the casing 1 has a number of sound apertures h formed on its upper plate, on the inner face of which a speaker cone 4 is tightly carried. At the top of the speaker cone 4, a vibration transmitting member 5 is fixedly attached such that it can be held parallel to the record face of the record disc with a sufficient distance.

In this way, the pickup 6 can reciprocally travel between the starting point 3a and the end point 3b while being interposed by the record disc 3 and the vibration transmitting member 5.

In the drawing, numeral 11 denotes a starting bar which is inserted from the portion above the upper plate of the housing 1b into the interior of the housing 1b and is freely movable forward or rearward, and is normally urged upward by a coil spring 22 disposed on the upper plate and around the starting bar 11.

The forward tip end of the starting bar 11 is arranged to push the upper face of the record disc 3 by passing through the through hole 21.

Into the transmission case 19, the center shaft 2 projects, around the forward end of which a gear wheel as a smaller diameter driving wheel 14 is attached. An output shaft 12 for external means is disposed being received in parallel to the center shaft 2 and is freely rotatable.

Fixedly attached around the output shaft 12 is a gear wheel as a larger diameter follower wheel 15. Positional relationship between the driving wheel 14 and the follower wheel 15 is shown in FIGS. 1(A) and 1(B). That is, when the record disc 3 made integral with the center shaft 2 is positioned to be sustained by the pickup 6 against the resilient force imparted by the coil spring 10, namely, when it is under sound reproduction, the driving wheel 14 stays below the follower wheel 15 so as to be out of engagement with the follower wheel 15. On the other hand, when the pickup 6 is dropped down in the annular recess d allowing record disc 3, turntable 3d and center shaft 2 to move upward as shown in FIG. 1(B), that is, when it has finished sound reproduction, the driving wheel 14 and the follower wheel 15 are meshing each other.

In this way, the driving wheel 14 and the follower wheel 15 constitute a transmission mechanism 13, which belongs to a type of power transmission by means of meshing and out of meshing of the two mating gears.

The sound-reproducing device embodying this example functions as explained below.

Operator depression of the starting lever 11 will cause the pickup to revert to the starting point 3a of the record disc 3, as shown in FIG. 1(A). If a starting switch (not shown) is made ON at this position, the electric motor 9 will start rotation, which, in turn, rotates the record disc 3, and thus the recorded sounds can be reproduced.

In the transmission mechanism (hereafter merely referred to as transmission) 13 at this position, the driving wheel 14 is placed out of meshing contact with the follower wheel 15, so the driving force is not transmitted to the output shaft 12 for external means. The pickup 6 travels toward the end point of sound reproduction 3a while it is slidably engaging the vibration transmitting member 5 until it is lowered down into the recess d after it has passed over the end point of sound reproduction 3b. Then the record disc 3 moves together with the center shaft, under the resilient force imparted by the stylus force spring 10, up to the position shown by FIG. 1(B). By virtue of this movement, the driving wheel 14 and the following wheel 15 in the transmission mesh each other, which results in the transmission of the driving force of the motor 9 to the output shaft 12. In this position, of course, the record disc 3 still continues rotation but the pickup 6 is still received in the recess d, so the reproduction of the recorded sounds cannot be performed. In this way, external means (not shown) alone coupled to the output shaft 12 can be driven to continue rotation, thereby the so-called successive operation of sound reproduction followed by the operation of any related external means can be performed in a satisfactory manner.

Figure 1B:
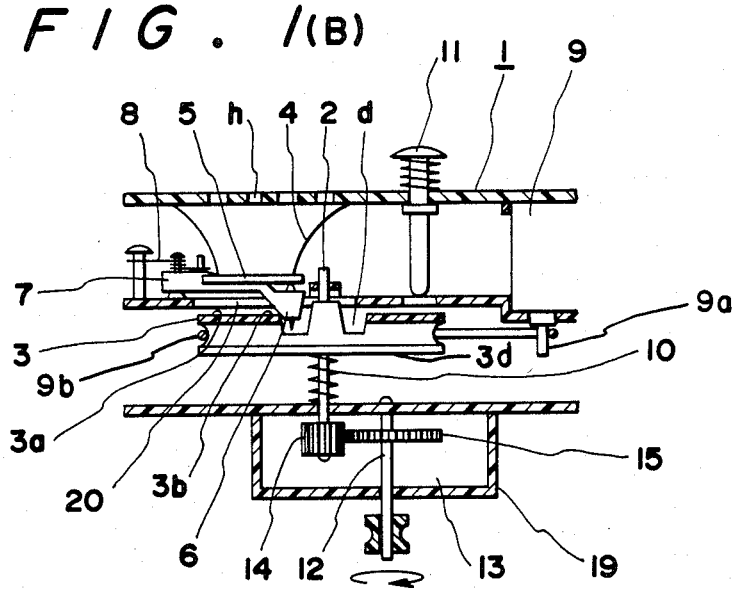
Figure 2:
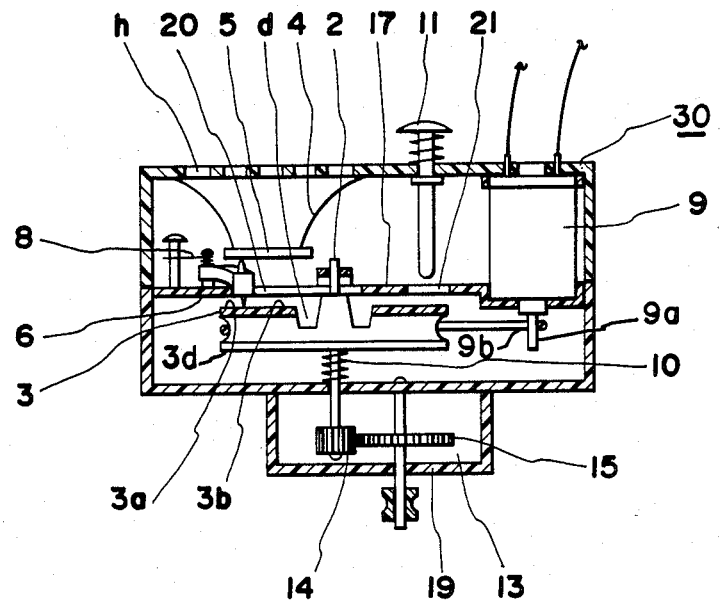
FIG. 2(A) is a sectional, elevational view of a second embodiment of the present invention.
FIG. 2(B) is a similar sectional view showing the change of operation.
Figure 2B:
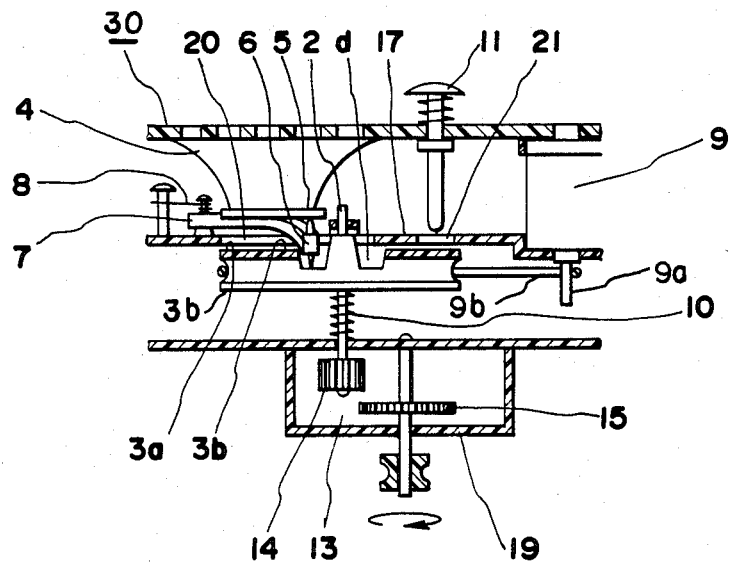

Referring now to FIGS. 2(A) and 2(B) for a second example of the present invention, there is illustrated a device 30 which is similar to the device shown in FIGS. 1(A) and 1(B) except for the transmission 13, so explanation will now be limited only to the construction of the transmission 13 adopted in this second example.

According to the transmission 13 of this example, positional relationship between the driving wheel 14 and the follower wheel 15 is shown in FIGS. 2(A) and 2(B). As shown in FIG. 2(A), the driving wheel 14 and the follower wheel 15 are in meshing relation during the period of sound reproduction, as shown in FIG. 2(A), while the meshing of the two members is interrupted upon completion of the sound reproduction, as shown in FIG. 2(B). In other words, according to this example, sound reproduction and the operation of the external means are conducted concurrently.

Figure 3:
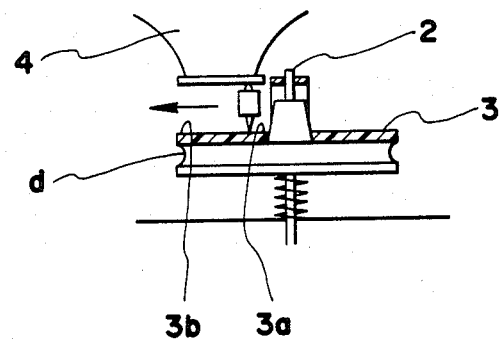
FIG. 3(A) is a partial, front view of a third embodiment of the present invention.
FIG. 3(B) is a view similar to FIG. 3(A) showing a change in operation.
Figure 3B:
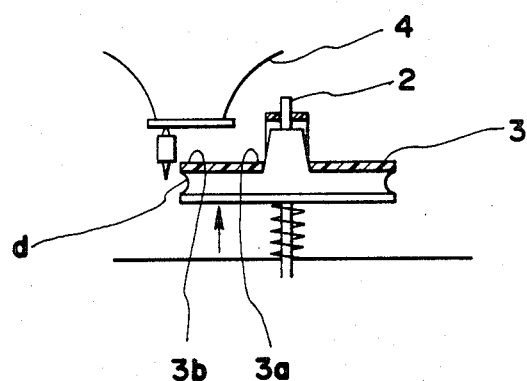

Referring now to FIGS. 3(A) and 3(B), the third example of the present invention is substantially the same as the device illustrated in FIGS. 1 and 2, and thus only those portions required to explain the third example are disclosed.

According to this example, the starting point of sound reproduction 3a lies around the center shaft 2, while the end point 3b lies on the outer periphery of the record disc 3, so the vacant space outside the recorded disc 3 can be used as a space for allowing the stylus to be dropped downward.

Upon completion of sound reproduction, the record disc 3, together with the center shaft 2, travels from the position shown in FIG. 3(A) to that shown in FIG. 3(B) and performs switching of transmission upon completion of sound reproduction (not depicted here).

I claim:

1. A simplified sound-reproducing device comprising:
    a casing,
    a center shaft mounted within the casing,
    means for axially advancing and retracting the center shaft,
    a record disc having a recorded face with starting and end points of sound reproduction, the record disc being rotatably carried by the center shaft and capable of axially advancing or retracting together with said center shaft,
    a sound reproducing stylus,
    a recess formed in the record disc for allowing a dropping movement thereinto of the sound-reproducting stylus,
    a speaker cone tightly attached to an inner face of said casing,
    a vibration transmitting member attached to the speaker cone and disposed to be confronted with the record face of said record disc,
    a pickup,
    a tone arm swingably mounted in the casing and at a forward end, the tone arm being normally interposed between said vibration transmitting member and said recorded face of said record disc for reciprocal movement between the starting point and end point of sound reproduction of said record disc,
    a return spring normally urging said tone arm toward such directions that said pickup can move toward said starting point of sound reproduction and away from said recorded face,
    a motor coupled to said record disc for driving said record disc,
    a stylus force spring normally urging said record disc toward said vibration transmitting member,
    a starting bar extending into said casing from outside of said casing to move said record disc against the reslient force imparted by said stylus force spring,
    an output shaft projecting outside of said casing from the interior of said casing,
    transmission means for coupling said output shaft with said motor via said center shaft, said transmission means comprising:
    a driving wheel fixed to a portion of said center shaft and a follower wheel fixed to said output shaft and disposed in parallel with said center shaft so as to be coupled with said driving wheel and
    means for causing axial movement of said center shaft and said driving wheel relative to said output shaft and said follower wheel at the end point of sound reproduction to contol the engagement between said driving wheel and said follower wheel and the coupling between said motor and said output shaft via said center shaft.

2. The simplified sound-reproducing device as claimed in claim 1, wherein said driving wheel and said follower wheel are composed of a pair of gear wheels meshing with each other.

3. The simplified sound-reproducing device as claimed in claim 1, wherein said driving wheel and said follower wheel are composed of a pair of gear wheels which are disposed in such a relationship in the axial direction that said gear wheels are placed out of meshing engagement when the recorded face of said record disc engages said pickup, while said pair of gear wheels are brought into meshing engagement when said record disc is disengaged said pickup, and said record disc is still raised upward by the force imparted on said record disc by said stylus force spring.

4. The simplified sound-reproducing device as claimed in claim 1, wherein said driving wheel and said follower wheel are composed of a pair of gear wheels which are disposed in such a relationship in the axial direction that said pair of gear wheels mesh with each other when the recorded face of said record disc engages said pickup, while said pair of gear wheels are placed out of meshing engagement when said record disc is disengaged from said pickup and the accompanying dropping down of said pickup into the recess in the record disc.

5. The simplified sound-reproducing device as claimed in claim 1, wherein said end point of sound reproduction is located adjacent to said center shaft and said pickup is normally urged by said return spring toward the outer periphery of said record disc, the recess being formed at the inner portion of the record disc at the end point of sound reproduction for allowing dropping down of said pickup thereinto when it has finished a sound reproduction to permit axial movement of the record disc.

6. The simplified sound-reproducing device as claimed in claim 1, wherein said end point of sound reproduction is located at the outer periphery of said record disc and said pickup is normally urged by said return spring toward the center of said record disc, the outer extremity of said record disc constitutes a margin for dropping down of said pickup when it has finished a sound reproduction and gone out of said record disc.

* * * * *